(12) United States Patent  
Freeman

(10) Patent No.: US 10,739,083 B1  
(45) Date of Patent: Aug. 11, 2020

(54) SYSTEM AND METHOD FOR STORING THERMAL ENERGY IN A HEATED LIQUID IN A PRESSURIZED VESSEL

(71) Applicant: Walter B. Freeman, Cave Junction, OR (US)

(72) Inventor: Walter B. Freeman, Cave Junction, OR (US)

( * ) Notice: Subject to any disclaimer, the term of this patent is extended or adjusted under 35 U.S.C. 154(b) by 48 days.

(21) Appl. No.: 16/351,276

(22) Filed: Mar. 12, 2019

Related U.S. Application Data

(60) Provisional application No. 62/721,071, filed on Aug. 22, 2018.

(51) Int. Cl.  
*F28D 20/00* (2006.01)

(52) U.S. Cl.  
CPC .. *F28D 20/0034* (2013.01); *F28D 2020/0082* (2013.01); *F28D 2020/0086* (2013.01)

(58) Field of Classification Search  
CPC ......... F28D 20/0034; F28D 2020/0082; F28D 2020/0086  
See application file for complete search history.

(56) References Cited

U.S. PATENT DOCUMENTS

| | | |
|---|---|---|
| 4,231,842 A | 11/1980 | Ojala |
| 4,249,592 A | 2/1981 | Greene |
| 4,507,925 A | 4/1985 | Schaetzle et al. |
| 5,971,027 A | 10/1999 | Beachley et al. |
| 6,493,507 B2 | 12/2002 | Salyer |
| 6,663,049 B1 | 12/2003 | Jakubowski, Jr. et al. |
| 8,171,728 B2 | 5/2012 | Bollinger et al. |
| 9,890,314 B2 * | 2/2018 | Chen ...................... F24S 60/00 |
| 9,995,285 B2 | 6/2018 | Ehrsam et al. |
| 10,012,113 B2 | 7/2018 | Vamvas |
| 2009/0294096 A1 * | 12/2009 | Mills ................... F28D 20/0043 165/45 |
| 2011/0017196 A1 * | 1/2011 | Bell ........................ F28D 20/00 126/400 |
| 2011/0081134 A1 * | 4/2011 | Salyer ................... F24H 9/2021 392/308 |
| 2011/0083436 A1 | 4/2011 | White et al. |

(Continued)

FOREIGN PATENT DOCUMENTS

WO WO02079707 10/2002

*Primary Examiner* — Gordon A Jones  
(74) *Attorney, Agent, or Firm* — Jerry Haynes Law

(57) ABSTRACT

A system and method for storing thermal energy in a heated liquid in a pressurized vessel employs an inner and outer vessel. The inner vessel contains water or specific liquids for storage and potential use of thermal energy contained therein. An outer vessel encapsulates an inner vessel, with a vacuum formed there between. The inner vessel comprises an upper portion containing an unheated liquid and a lower portion containing a heated liquid. A sliding insulated barrier segregates liquids. The pressure generated by the heated liquid, and incompressibility of unheated liquid equalizes static pressure within the inner vessel, which helps prevent the heated liquid in the lower portion from forming a vapor phase. Heated liquid egresses the lower portion of inner vessel to pass through a vapor producing apparatus to become vapor, then an expander to become condensate, and finally to a heat source for reintroduction into the inner vessel.

20 Claims, 3 Drawing Sheets

(56) References Cited

U.S. PATENT DOCUMENTS

| | | | |
|---|---|---|---|
| 2014/0060046 A1* | 3/2014 | Takahashi | F01K 23/10 |
| | | | 60/641.8 |
| 2015/0240792 A1 | 8/2015 | Ehrsam et al. | |
| 2016/0061533 A1 | 3/2016 | Hashiba et al. | |
| 2017/0321968 A1 | 11/2017 | Danov et al. | |
| 2018/0238636 A1* | 8/2018 | Chopard | F01M 11/0004 |
| 2019/0011197 A1* | 1/2019 | Chopard | F28D 20/021 |
| 2020/0166290 A1* | 5/2020 | Gattuso | F28D 17/04 |

* cited by examiner

US 10,739,083 B1

SYSTEM AND METHOD FOR STORING THERMAL ENERGY IN A HEATED LIQUID IN A PRESSURIZED VESSEL

CROSS-REFERENCE TO RELATED APPLICATIONS

This application claims the benefits of U.S. provisional application No. 62/721,071, filed Aug. 22, 2018 and entitled THERMAL ENERGY STORAGE SYSTEM, which provisional application is incorporated by reference herein in its entirety.

FIELD OF THE INVENTION

The present invention relates generally to a system and method for storing thermal energy in a heated liquid in a pressurized vessel. More so, the present invention relates to a system and method for storing thermal energy that employs an inner and outer vessel that contain water for the storage and potential use of thermal energy contained therein; whereby an outer vessel encapsulates an inner vessel, with a vacuum formed therebetween. Whereby the inner vessel comprises an upper portion containing an unheated liquid and a lower portion containing a heated liquid; whereby a sliding insulated barrier segregates the liquids; whereby the pressure generated by the heated liquid, and the incompressibility of the unheated liquid equalizes the static pressure within the inner vessel, so as to help prevent the heated liquid in the lower portion from forming a vapor phase; and whereby the heated water egresses the lower portion of inner vessel to pass through a vapor producing apparatus to become vapor, then an expander to become condensate, and finally to a heat source for reintroduction into the inner vessel

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, transfer and storage of thermal energy has generally been accomplished through the use of mechanical compressors and the like that convert mechanical energy into thermal energy through the compression and expansion of appropriate compounds such as chloro-fluorocarbons. Problems with these compounds and their effect on the environment, however, have led those in the field to examine alternative compounds for use in mechanical compressor devices and to look to other means for the storage and transfer of thermal energy.

It is also known that because of the increased development of alternative energy, particularly power produced by sunlight and wind, there is a growing need for systems designed to store energy efficiently and economically. Many of the current storage systems (batteries, molten salt, or metal) are complex, expensive and pose significant environmental risks during both use and decommissioning however.

SUMMARY

Illustrative embodiments of the disclosure are generally directed to a system and method for storing thermal energy in a liquid contained in a pressurized vessel. The system and method for storing thermal energy employs an outer vessel and an inner pressure vessel that are separated by a vacuum and contain a working liquid, such as water. The inner vessel is also insulated from the outer vessel to minimize energy loss.

In one embodiment, the system for storing thermal energy in a heated and pressurized vessel, the system comprises a heat source used to heat a liquid, such as water. The system also includes an inner vessel that is defined by a first outer surface, a first inner surface, an inner volume, an upper portion, and a lower portion. The upper portion contains an unheated liquid, and the lower portion containing a heated liquid. A heated liquid intake is in fluid communication with the lower portion of the inner vessel, so as to introduce the heated liquid from the heat source into the lower portion of the inner vessel. Further, a heated liquid outlet is in fluid communication with the lower portion of the inner vessel. The system may also utilize an unheated liquid intake in fluid communication with the upper portion of the inner vessel. The unheated liquid intake carries the unheated liquid to the upper portion of the inner vessel.

The system further comprises an outer vessel defined by a second outer surface and a second inner surface, the outer vessel encapsulating the inner vessel. In some embodiments, a sliding insulation barrier is longitudinally displaced through the inner volume of the inner vessel. The sliding insulation barrier forms a seal with the first inner surface of the inner vessel. In this manner, the unheated and heated liquids are segregated by the sliding insulation barrier.

The sliding insulation barrier moves in a first direction as heated liquid is introduced into the inner vessel; and moves in a second direction as the heated liquid egress from the inner vessel. The introduction of the heated liquid into the lower portion and the unheated liquid in the upper portion equalize static pressure between the upper and lower portions. The equalization of static pressure in the inner vessel facilitates displacement of the unheated liquid into the upper portion.

In some embodiments, the system comprises at least one insulated cable that extends between the second outer surface of the outer vessel and the first outer surface of the inner vessel. The insulated cable is configured to suspend the inner vessel from the outer vessel. At least one thermal insulator encapsulating at least a portion of the insulated cable. At least one horizontal reinforcing member works to at least partially wrap around the inner vessel in a horizontal orientation. At least one vertical reinforcing member works to at least partially wrap around the inner vessel in a vertical orientation. The reinforcing members help reinforce the structural integrity of the inner vessel.

In some embodiments, the system comprises a vacuum pump that forms at least a partial vacuum between the outer and inner vessels. In this manner, the inner vessel is operational in at least a partial vacuum. Further, a conduit is in fluid communication with the heated liquid intake and the heated liquid outlet. While ingressing the heated liquid into the lower portion through the heated liquid intake and the conduit, the sliding insulation barrier is urged in the first direction. Egressing the heated liquid from the lower portion through the heated liquid outlet and the conduit urges the sliding insulation barrier in the second direction.

In some embodiments, the system comprises a vapor producing apparatus that receives the heated liquid from the heated liquid outlet through the conduit. The vapor producing apparatus generates vapor from the heated liquid. The system also uses an expander that receives the vapor from the vapor producing apparatus through the conduit. The expander generates condensate from the vapor. The conduit carries the condensate to the heat source for heating and introduction into the heated liquid intake. In other embodiments, a metering valve is operational at the unheated liquid intake at the upper portion of the inner vessel to regulate flowage of the unheated liquid. Whereby, the temperature of the inner vessel is regulated at least partially based on the flowage rate through the metering valve.

In one aspect, the system for storing thermal energy in a heated liquid contained in a pressurized vessel comprises an inner vessel that is defined by a first outer surface, a first inner surface, an inner volume, an upper portion, and a lower portion forming an outlet. The upper portion contains an unheated liquid, and the lower portion contains a heated liquid. An unheated liquid intake introduces the unheated liquid into the lower portion of the inner vessel.

In some embodiments, the system comprises an outer vessel that is defined by a second outer surface and a second inner surface. The outer vessel encapsulates the inner vessel. The system also provides a sliding insulation barrier that is longitudinally displaceable through the inner volume of the inner vessel. The sliding insulation barrier forms a seal with the first inner surface of the inner vessel. In this manner, the unheated and heated liquids are segregated by the sliding insulation barrier.

In some embodiments, the system comprises at least one insulated cable that extends between the second outer surface of the outer vessel and the first outer surface of the inner vessel. The inner vessel is suspended by the insulated cable from the outer vessel. At least one thermal insulator encapsulates at least a portion of the insulated cable. Further, at least one horizontal reinforcing member at least partially wraps around the inner vessel in a horizontal orientation. Further, at least one vertical reinforcing member at least partially wraps around the inner vessel in a vertical orientation. In this manner, the reinforcing members help reinforce the structural integrity of the inner vessel.

In some embodiments, the system comprises a vacuum pump that evacuates air, and forms at least a partial vacuum between the outer and inner vessels. Thus, the inner vessel is operational in at least a partial vacuum.

In some embodiments, the system comprises a metering valve that is operational at the outlet of the lower portion of the inner vessel. The metering valve works to regulate flowage of the unheated liquid being displaced from the inner vessel. Consequently, the temperature of the boiler, the heat exchanger, or the solar thermal collector, is regulated at least partially based on the flowage rate through the metering valve.

In another aspect, the system comprises a safety release mechanism operational in the metering valve.

In another aspect, the system comprises a radiant energy heat shield encapsulating the inner vessel.

In another aspect, the inner vessel and the outer vessel have a cylindrical shape.

In another aspect, the liquid comprises water.

In another aspect, the heated liquid comprises a temperature in excess of 1000° Fahrenheit and a pressure of about 3200 pounds per square inch.

In another aspect, the inner vessel is fabricated from a metal alloy.

In another aspect, the outer vessel is fabricated from the metal alloy.

In another aspect, the horizontal reinforcing member has a ring shape.

In another aspect, the vertical reinforcing member has a ring shape.

In another aspect, the boiler comprises a water heater, a heat exchanger, or a solar thermal collector.

One objective of the present invention is to store energy efficiently and economically.

Another objective is to provide a new and useful consumer oriented energy utilization system.

Another objective is to provide a uniform generation and storage of thermal energy while minimizing intermittent generation thereof.

Another objective is to create multiple layers of insulation between the vessels containing the working liquid to minimize heat loss Yet another objective is to provide a new and useful thermal energy storage system which employs an inner and outer vessel in which the inner vessel contains working liquids for the storage of thermal energy therein.

Yet another objective is to immerse the inner vessel in a vacuum and in a compressed state to increase stability of the thermal energy storage.

Yet another objective is to insulate the inner vessel from the outer vessel, the cables, and the radiant energy heat shield to minimize energy loss to the outer vessel and hence to the atmosphere.

Yet another objective is to provide a new and useful thermal energy storage system having minimum construction costs, minimum operating costs and maximum efficiency.

Yet another objective is to provide a system and method for storing thermal energy that is simple to use, inexpensive, and minimizes environmental risks during use and decommissioning.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
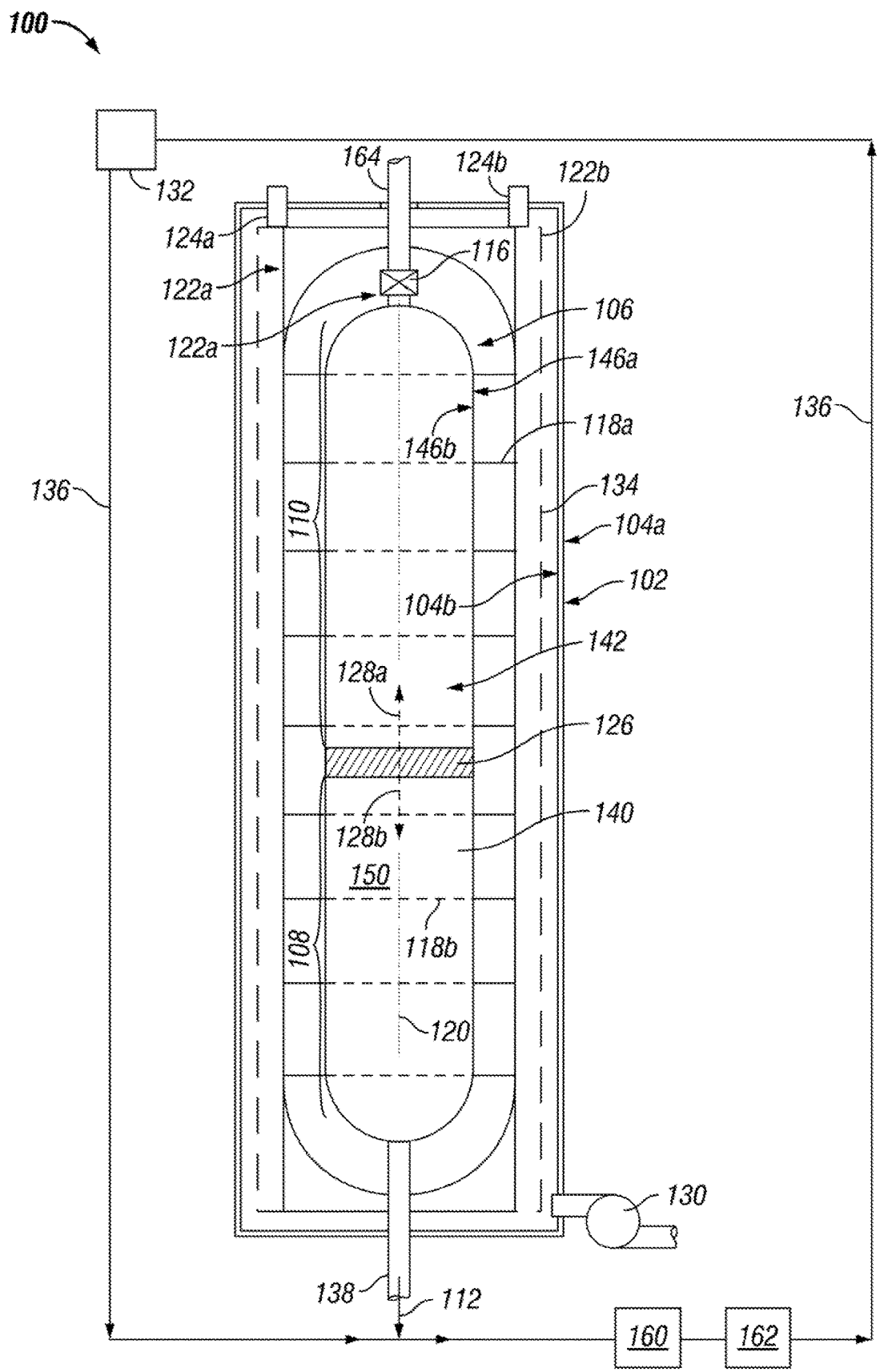
FIG. 1 illustrates a sectioned side view of an exemplary system for storing thermal energy in a heated and pressurized vessel, showing an inner vessel containing a working fluid and an outer vessel encapsulating the inner vessel, in accordance with an embodiment of the present invention.
Figure 2A:
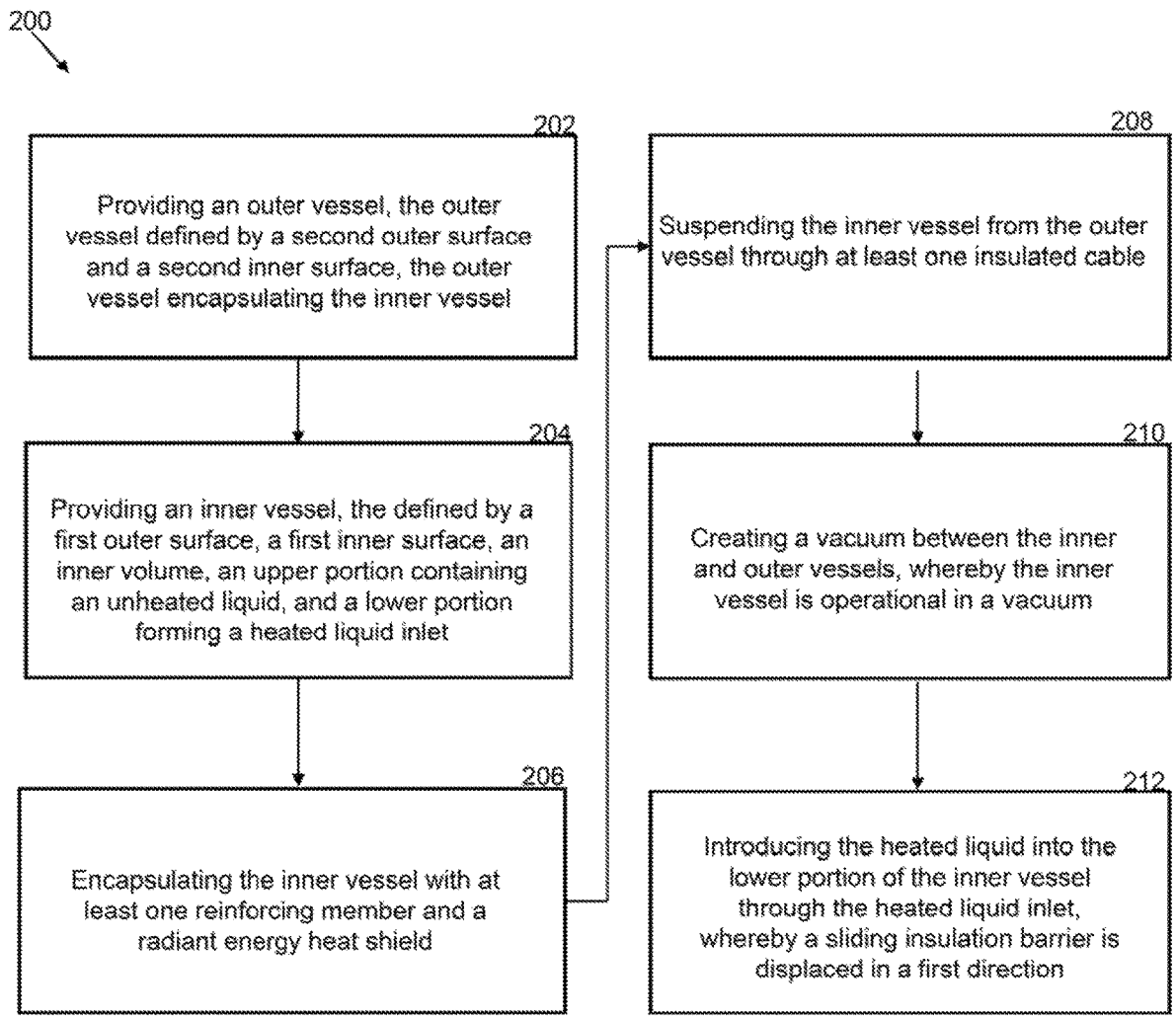
FIGS. 2A and 2B illustrate a flowchart diagram of an exemplary method for storing thermal energy in a heated and pressurized vessel, in accordance with an embodiment of the present invention.
Figure 2B:
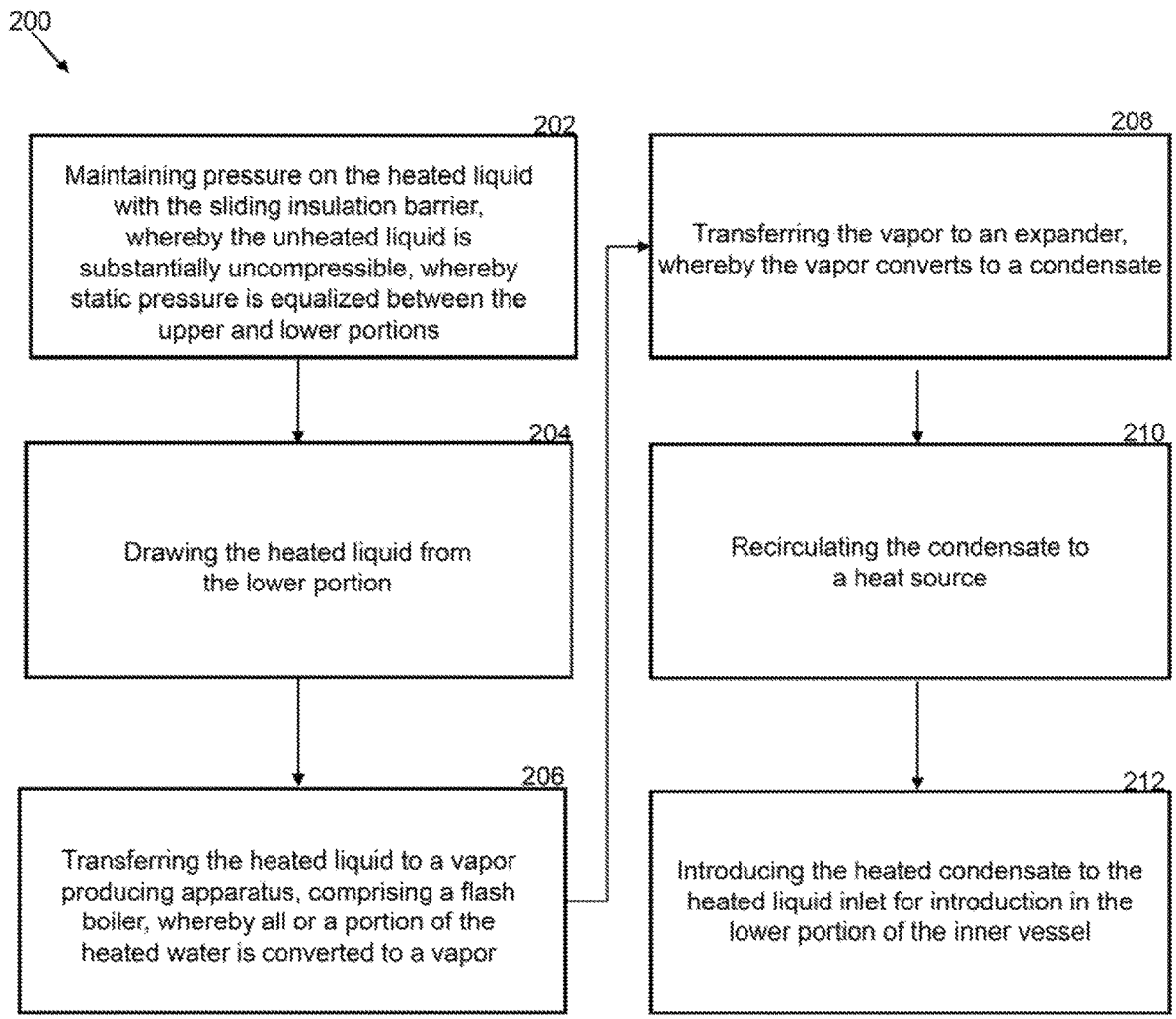

A system 100 and method 200 for storing thermal energy in a heated and pressurized vessel is referenced in FIGS. 1-2B. The system 100 and method for storing thermal energy employs an outer vessel 102 and an inner vessel 106 that contain a working liquid, such as water, for the storage and potential use of thermal energy contained therein. The working liquid has characteristics that efficiently store thermal energy in a pressurized and heated vessel. The system 100 also allows the working liquid to controllably expand the thermal energy to drive a sliding insulation barrier 126. This creates uniform storage of thermal energy.

The inner vessel 106 has a lower portion 108 into which heated liquid 140 is introduced through a heated liquid intake 138, and discharged through a heated liquid outlet 112. The heated liquid comprises a temperature in excess of 1000° Fahrenheit and a pressure of about 3200 pounds per square inch. The inner vessel 106 also has an upper portion 110 that contain an unheated liquid 142. The unheated liquid 142 may include the same water that makes up the heated liquid 140, except that substantially less heat and pressure are applied thereon.

As FIG. 1 references, the inner vessel 106 is insulated from the outer vessel to minimize energy loss. The inner vessel 106 contains working liquids for the storage of thermal energy therein. In one possible embodiment of the system 100, the inner vessel 106 is encapsulated and maintained in a vacuum within an outer vessel 102 for enhanced stability. The inner vessel 106 serves to pressurize a volume of unheated liquid 142 contained in the upper portion 110 of the inner vessel 106. In one non-limiting embodiment, the inner vessel 106 has a cylindrical shape, and is fabricated from a metal alloy. Though other materials that can withstand high temperatures and pressures may also be used.

In some embodiments, the system 100 comprises an outer vessel 102 that is defined by a second outer surface 104a and a second inner surface 104b. The outer vessel 102 encapsulates the inner vessel 106. In one non-limiting embodiment, the outer vessel 102 has a cylindrical shape, and is fabricated from a metal alloy. An unheated liquid intake 164 is in fluid communication with the upper portion of the inner vessel. The unheated liquid intake 164 carries the unheated liquid to the upper portion of the inner vessel.

In some embodiments, the system 100 comprises at least one insulated cable 122a, 122b that extends between the second outer surface 104a of the outer vessel 102 and the first outer surface 146a of the inner vessel 106. The inner vessel 106 is suspended by the insulated cable 122a, 122b from the outer vessel 102. The insulated cable 122a, 122b may be resilient or semi-rigid. At least one thermal insulator 124a, 124b encapsulates at least a portion of the insulated cable 122a, 122b, so as to prevent heat loss from the inner vessel 106 through the cable 122a, 122b. The thermal insulator 122a-b positions between the vessels 102, 106 to help insulate the cables from the outer vessel. In another insulating means, the system 100 provides a radiant energy heat shield 134 that encapsulates the inner vessel 106. The radiant energy heat shield 134 serves to minimize heat transfer and loss, from the inner vessel 106 to the outer vessel 102 by reflecting radiant heat. In some embodiments, the radiant energy heat shield 134 may include an aluminum foil, or any highly reflective material that reflects radiant heat rather than absorbing it.

In yet another embodiment, the system 100 utilizes at least one horizontal reinforcing member 118a, 118b that at least partially wraps around the inner vessel 106 in a horizontal orientation. In one non-limiting embodiment, the horizontal reinforcing member 118a-b has a ring shape. Further, at least one vertical reinforcing member 120 at least partially wraps around the inner vessel 106 in a vertical orientation. In one non-limiting embodiment, the vertical reinforcing member 120 may have an elongated ring shape. Though the shape and number of reinforcing members 118a-b, 120 may vary, depending on the needs for structural integrity and pressure applied to the inner vessel 106. In this manner, the reinforcing members 118a-b, 120 help reinforce the structural integrity of the inner vessel 106. In some embodiments, the system 100 comprises a vacuum pump 130 that evacuates air to form at least a partial vacuum between the outer and inner vessels 102, 106. In this manner, the inner vessel 106 is operational in at least a partial vacuum.

The system 100 also provides a sliding insulation barrier 126 that is longitudinally displaceable through the inner volume of the inner vessel 106. The sliding insulation barrier 126 forms a seal with the first inner surface 146b of the inner vessel 106. In this manner, the unheated and heated liquids are segregated by the sliding insulation barrier 126. The sliding insulation barrier is displaced upwardly in a first direction 128a towards the upper portion as heated liquid is introduced into the lower portion. The sliding insulation barrier moves in a second direction 128b as the heated liquid 140 egresses from the lower portion inner vessel 106.

The lower portion 108 of the inner vessel 106 forms a heated liquid intake 138 that enables passage and introduction of a heated liquid 140 into the inner volume 150. The heated liquid intake 138 may include a water source. The heated liquid may include a temperature in excess of 1000° Fahrenheit and a pressure of about 3200 psi. Though in other embodiments, different temperatures and pressures may be used to accommodate variously sized vessels and different liquids. The volume of heated and pressurized liquid is maintained under pressure in the lower portion 108 of the inner vessel 106.

The unheated liquid 142 is introduced through an unheated liquid intake 164 into the upper portion 110. While in the upper portion, and segregated from the lower portion by the sliding insulated barrier 126, the unheated liquid is substantially incompressible, and serves to apply pressure on the heated liquid in the lower portion of the inner vessel, through the sliding insulation barrier. The pressure generated by the heated liquid, and the incompressibility of the unheated liquid equalizes the static pressure within the inner vessel 106. This helps prevent the heated liquid in the lower portion from forming a vapor phase, which would cause a reduction of the thermodynamic nature of the liquid.

In a utilization step, the heated water is drawn from the lower portion of the inner vessel below the sliding insulation barrier. A conduit 136 is in fluid communication with the heated liquid intake and the heated liquid outlet 112, so as to carry the heated liquid from the lower portion. In this manner, ingressing the heated liquid into the lower portion through the heated liquid intake 138 and the conduit displaces the sliding insulation barrier in the first direction 128*a*. And egressing the heated liquid from the lower portion through the heated liquid outlet 112 and the conduit displaces the sliding insulation barrier in the second direction 128*b*.

The heated water is transferred to a vapor producing apparatus 160 which is comprised of a flash boiler. The vapor producing apparatus 160 converts all or a portion of the heated water to be converted into a vapor. The resultant vapor is utilized for power with an expander 162, or an air cooling device. In some applications, the power producing system may be a thermal energy recovering system that is covered in previous patents. This allows for the transfer of the working liquid into the heating system with minimal pumping power required.

Exhaust vapor generated by the expander 162, is condensed and pumped under pressure to the upper portion of the inner vessel through a conduit 136. The conduit 136 may include a metal pipe suitable for carrying water at high temperatures. Looking again at FIG. 1, the system 100 comprises a heat source 132, such as a boiler, heat exchanger, or solar thermal collector that is operational along the conduit 136. In one non-limiting embodiment, the heat source 132 comprises a boiler, or water heater, or solar thermal collector that can heat the unheated liquid 142 to a temperature that in some embodiments can be in excess of 1000° Fahrenheit. In other embodiments, the heated water/liquid can be at any elevated temperature depending on the application/use, but can be as high as +1000° F. The boiler 132 heats the unheated liquid 142 in the conduit 136 for introduction into the heated liquid intake 138, where the heated liquid enters the inner volume 150 of the lower portion of the inner vessel.

In some embodiments, the system 100 comprises a metering valve 114 that is operational at the outlet of the upper portion 110 of the inner vessel 106. In one embodiment, the metering valve 114 is a pump. The metering valve 114 works to regulate flowage of the unheated liquid 142 being displaced from the upper portion 110 of the inner vessel 106. In one non-limiting embodiment, a safety release mechanism 116 is operational in the metering valve 114. Through controlled manipulation of the metering valve 114, the temperature of the heat source 132, i.e., boiler, the heat exchanger, or the solar thermal collector, is regulated based on the flowage rate through the metering valve 114. Thus, the thermal energy storage capacity and time in the liquid can be controlled by regulating the speed of unheated liquid 142 being displaced from the upper portion 110 of the inner vessel 106.

In one exemplary operation, a storage phase, the heated liquid is generated in the solar thermal collector, or a water heater powered by electricity. The electricity was generated by photovoltaic array, or a wind powered device. The source of heated liquid may be a heat exchanger which absorbs heat from any intermittent or variable heat flow.

Next, the heated water is introduced into the bottom of the internal pressure vessel. The sliding insulation barrier is movable, moving upwardly as the heated water is introduced into the lower portion of the pressure vessel. The water above the sliding insulation barrier (being virtually incompressible) serves to maintain pressure on the heated water being transferred to the pressure vessel from the heat source. This prevents the heated water from developing a vapor phase, which would cause a reduction of the thermodynamic density of the heated water. Additionally, the pressure applied to the sliding insulation barrier by the heated water, and consequently to the unheated water in the upper portion of the tank, serves to equalize the static pressure within the heating and storage system. This allows for the transfer of the unheated water into the heating system with minimal pumping power required.

In a utilization step, heated water is drawn from the lower portion of the pressure vessel below the sliding insulation barrier. The heated water is transferred to a vapor producing system, which is comprised of a flash "boiler" that causes all or a portion of the water to be converted into a vapor. The resultant paper is utilized in an expander or an air cooling device to produce power. In some applications, the power producing system may be a thermal energy recovery system is covered in previous patents. Exhaust vapor generated by the expander, is condensed and pumped under pressure to the portion of the pressure vessel above the sliding insulation barrier in the pressure vessel.

FIGS. 2A and 2B illustrate a flowchart diagram of an exemplary method 200 for storing thermal energy in a heated and pressurized vessel. The method 200 may include an initial Step 202 of providing an outer vessel, the outer vessel defined by a second outer surface and a second inner surface, the outer vessel encapsulating the inner vessel.

The method 200 may further comprise a Step 204 of providing an inner vessel, the defined by a first outer surface, a first inner surface, an inner volume, an upper portion containing an unheated liquid, and a lower portion forming a heated liquid intake. A Step 206 includes encapsulating the inner vessel with at least one reinforcing member and a radiant energy heat shield. This creates an insulative effect that reduces thermal energy loss from the inner vessel 106.

In some embodiments, a Step 208 comprises suspending the inner vessel from the outer vessel through at least one insulated cable. At least one thermal insulator 124*a*, 124*b* encapsulates at least a portion of the insulated cable 122*a*, 122*b*, so as to prevent heat loss from the inner vessel 106 through the cable 122*a*, 122*b* or rod. A Step 210 includes creating a vacuum between the inner and outer vessels, whereby the inner vessel is operational in a vacuum. This stabilizes the inner vessel 106, and also serves as a thermal energy insulator.

In some embodiments, a Step 212 introducing the heated liquid into the lower portion of the inner vessel through the heated liquid intake, whereby a sliding insulation barrier is displaced in a first direction. A Step 214 comprises maintaining pressure on the heated liquid with the sliding insulation barrier, whereby the unheated liquid is substantially uncompressible, whereby static pressure is equalized between the upper and lower portions. Another Step 216 may include drawing the heated liquid from the lower portion.

A Step 218 includes transferring the heated liquid to a vapor producing apparatus, comprising a flash boiler, whereby all or a portion of the heated water is converted to a vapor. Another Step 220 may include transferring the vapor to an expander, whereby the vapor converts to a condensate. A Step 222 includes recirculating the condensate to a heat source. A final Step 224 comprises introducing the heated condensate to the heated liquid intake for introduction in the lower portion of the inner vessel.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A system for storing thermal energy in a heated and pressurized vessel, the system comprising:
   a heat source, the heating source heating a liquid;
   an inner vessel defined by a first outer surface, a first inner surface, an inner volume, an upper portion, and a lower portion, the upper portion containing an unheated liquid, the lower portion containing a heated liquid;
   a heated liquid intake in fluid communication with the lower portion of the inner vessel, the heated liquid intake introducing the heated liquid from the heat source into the lower portion of the inner vessel;
   a heated liquid outlet in fluid communication with the lower portion of the inner vessel;
   an unheated liquid intake in fluid communication with the upper portion of the inner vessel, the unheated liquid intake carrying the unheated liquid to the upper portion of the inner vessel;
   an outer vessel defined by a second outer surface and a second inner surface, the outer vessel encapsulating the inner vessel;
   a sliding insulation barrier longitudinally displaceable through the inner volume of the inner vessel, the sliding insulation barrier displaceable in a first direction and a second direction, the sliding insulation barrier forming a seal with the first inner surface of the inner vessel,
   whereby the unheated and heated liquids are segregated by the sliding insulation barrier,
   whereby the introduction of the heated liquid into the lower portion and the unheated liquid in the upper portion equalize static pressure between the upper and lower portions,
   whereby the equalization of static pressure in the inner vessel facilitates displacement of the unheated liquid from the upper portion;
   at least one insulated cable extending between the second outer surface of the outer vessel and the first outer surface of the inner vessel, the insulated cable suspending the inner vessel from the outer vessel;
   at least one thermal insulator encapsulating at least a portion of the insulated cable;
   at least one horizontal reinforcing member at least partially wrapping around the inner vessel in a horizontal orientation;
   at least one vertical reinforcing member at least partially wrapping around the inner vessel in a vertical orientation,
   whereby the at least one vertical and horizontal reinforcing members help reinforce the structural integrity of the inner vessel;
   a vacuum pump forming at least a partial vacuum between the outer and inner vessels,
   whereby the inner vessel is operational in at least a partial vacuum;
   a conduit being in fluid communication with the heated liquid intake and the heated liquid outlet,
   whereby ingressing the heated liquid into the lower portion through the heated liquid intake and the conduit displaces the sliding insulation barrier in the first direction,
   whereby egressing the heated liquid from the lower portion through the heated liquid outlet and the conduit displaces the sliding insulation barrier in the second direction;
   a vapor producing apparatus receiving the heated liquid from the heated liquid outlet through the conduit, the vapor producing apparatus generating vapor from the heated liquid;
   an expander receiving the vapor from the vapor producing apparatus through the conduit, the expander generating condensate from the vapor,
   whereby the conduit carries the condensate to the heat source for heating and introduction into the heated liquid intake; and
   a metering valve operational at the unheated liquid intake at the upper portion of the inner vessel, the metering valve regulating flowage of the unheated liquid,
   whereby the temperature of the inner vessel is regulated at least partially based on the flowage rate through the metering valve.

2. The system of claim 1, further comprising a safety release mechanism operational in the metering valve.

3. The system of claim 1, further comprising a radiant energy heat shield encapsulating the inner vessel.

4. The system of claim 1, wherein the inner vessel and the outer vessel have a cylindrical shape.

5. The system of claim 1, wherein the heated liquid comprises a temperature that exceeds 1000° Fahrenheit and a pressure of about 3200 pounds per square inch.

6. The system of claim 1, wherein the inner vessel and the outer vessel are fabricated from a metal alloy.

7. The system of claim 1, wherein at least one the horizontal reinforcing member has a ring shape.

8. The system of claim 1, wherein at least one the vertical reinforcing member has a ring shape.

9. The system of claim 1, wherein the heat source comprises a boiler, a water heater, a heat exchanger, or a solar thermal collector.

10. The system of claim 1, wherein the liquid comprises water.

11. A system for storing thermal energy in a heated and pressurized vessel, the system comprising:
    a heat source, the heating source heating a liquid;
    an inner vessel defined by a first outer surface, a first inner surface, an inner volume, an upper portion, and a lower portion, the upper portion containing an unheated liquid, the lower portion containing a heated liquid, the heated liquid comprising a temperature of about 1000° Fahrenheit and a pressure of about 3200 pounds per square inch, the inner vessel and the outer vessel being fabricated from a metal alloy;

a radiant energy heat shield encapsulating the inner vessel;
a heated liquid intake in fluid communication with the lower portion of the inner vessel, the heated liquid intake introducing the heated liquid from the heat source into the lower portion of the inner vessel;
a heated liquid outlet in fluid communication with the lower portion of the inner vessel;
an unheated liquid intake in fluid communication with the upper portion of the inner vessel, the unheated liquid intake carrying the unheated liquid to the upper portion of the inner vessel;
an outer vessel defined by a second outer surface and a second inner surface;
a sliding insulation barrier longitudinally displaceable through the inner volume of the inner vessel, the sliding insulation barrier displaceable in a first direction and a second direction, the sliding insulation barrier forming a seal with the first inner surface of the inner vessel,
whereby the unheated and heated liquids are segregated by the sliding insulation barrier,
whereby the introduction of the heated liquid into the lower portion and the unheated liquid in the upper portion equalize static pressure between the upper and lower portions,
whereby the equalization of static pressure in the inner vessel facilitates displacement of the unheated liquid into the upper portion;
at least one insulated cable extending between the second outer surface of the outer vessel and the first outer surface of the inner vessel, the insulated cable suspending the inner vessel from the outer vessel;
at least one thermal insulator encapsulating at least a portion of the insulated cable;
at least one horizontal reinforcing member at least partially wrapping around the inner vessel in a horizontal orientation;
at least one vertical reinforcing member at least partially wrapping around the inner vessel in a vertical orientation,
whereby the at least one vertical and horizontal reinforcing members help reinforce the structural integrity of the inner vessel;
a vacuum pump forming at least a partial vacuum between the outer and inner vessels,
whereby the inner vessel is operational in at least a partial vacuum;
a conduit being in fluid communication with the heated liquid intake and the heated liquid outlet,
whereby ingressing the heated liquid into the lower portion through the heated liquid intake and the conduit displaces the sliding insulation barrier in the first direction,
whereby egressing the heated liquid from the lower portion through the heated liquid outlet and the conduit displaces the sliding insulation barrier in the second direction;
a vapor producing apparatus receiving the heated liquid from the heated liquid outlet through the conduit, the vapor producing apparatus generating vapor from the heated liquid;
an expander receiving the vapor from the vapor producing apparatus through the conduit, the expander generating condensate from the vapor,
whereby the conduit carries the condensate to the heat source for heating and introduction into the heated liquid intake;
a metering valve operational at the unheated liquid intake at the upper portion of the inner vessel, the metering valve regulating flowage of the unheated liquid,
whereby the temperature of the inner vessel is regulated at least partially based on a flowage rate through the metering valve; and
a safety release mechanism operational in the metering valve.

12. The system of claim 11, wherein at least one the horizontal reinforcing member has a ring shape.

13. The system of claim 11, wherein at least one the vertical reinforcing member has a ring shape.

14. The system of claim 11, wherein the inner vessel has a cylindrical shape.

15. The system of claim 11, wherein the outer vessel has a cylindrical shape.

16. The system of claim 11, wherein the liquid comprises water.

17. A method for storing thermal energy in a heated and pressurized vessel, the system comprising:
providing an outer vessel, the outer vessel defined by a second outer surface and a second inner surface, the outer vessel encapsulating the inner vessel;
providing an inner vessel, the defined by a first outer surface, a first inner surface, an inner volume, an upper portion containing an unheated liquid, and a lower portion forming a heated liquid intake;
encapsulating the inner vessel with at least one reinforcing member and a radiant energy heat shield;
suspending the inner vessel from the outer vessel through at least one insulated cable;
creating a vacuum between the inner and outer vessels, whereby the inner vessel is operational in a vacuum;
introducing the heated liquid into the lower portion of the inner vessel through the heated liquid intake, whereby a sliding insulation barrier is displaced in a first direction;
maintaining pressure on the heated liquid with the sliding insulation barrier, whereby the unheated liquid is substantially uncompressible, whereby static pressure is equalized between the upper and lower portions;
drawing the heated liquid from the lower portion;
transferring the heated liquid to a vapor producing apparatus, comprising a flash boiler, whereby all or a portion of the heated water is converted to a vapor;
transferring the vapor to an expander, whereby the vapor converts to a condensate;
recirculating the condensate to a heat source; and
introducing the heated condensate to the heated liquid intake for introduction in the lower portion of the inner vessel.

18. The method of claim 17, further comprising a step of egressing the heated liquid from the lower portion of the inner vessel.

19. The method of claim 18, further comprising a step of displacing the sliding insulation barrier in a second direction as the heated liquid egresses the lower portion.

20. The method of claim 17, further comprising a step of measuring a flowage rate of the unheated liquid through a metering valve.

* * * * *